United States Defensive Publication [19] (H) [11] T973,014

Rambold [43] Aug. 1, 1978

[54] IMMERSIBLE BAG FOR EXHAUSTABLE SUBSTANCES

[76] Inventor: Adolf Rambold, Bachstrasse 8, D-4005 Meerbusch 1, Fed. Rep. of Germany

[21] Appl. No.: 870,727

[22] Filed: Jan. 19, 1978

[30] Foreign Application Priority Data

Dec. 10, 1977 [DE] Fed. Rep. of Germany ..... 2755203

[51] Int. Cl.[2] ..... A47G 19/16; B65B 29/04

[52] U.S. Cl. ..... 426/83; 206/0.5; 426/82

[57] ABSTRACT

An immersible bag (10) for exhaustable substances, with a bag containing the substance, which bag has a closed bag opening on the bag head (16), and with a bendable strip (12) folded along a transversely extending fold line, the strip having two legs continuously connected at the fold line, which legs are fastened on the bag and which legs receive therebetween the bag head adjacent the fold line, whereby the inner surface of the strip (which inner surface faces the bag) is formed at least at the fastening places by a thermoplastic synthetic material which is welded at the fastening places on the bag. The strip and the bag are spot welded at least at a spot or point-shaped fastening spot (38) on both outer sides of the bag, in the manner that the synthetic material is fused at the fastening spots with the porous material of the bag. One of said legs (20) having means (26) to secure the bag on the spout of a tea or brewing pot.

4 Claims, 1 Sheet Drawing,

14 Pages Specification

The file of this unexamined application may be inspected and copies thereof may be purchased (849 O.G. 1221, Apr. 9, 1968).

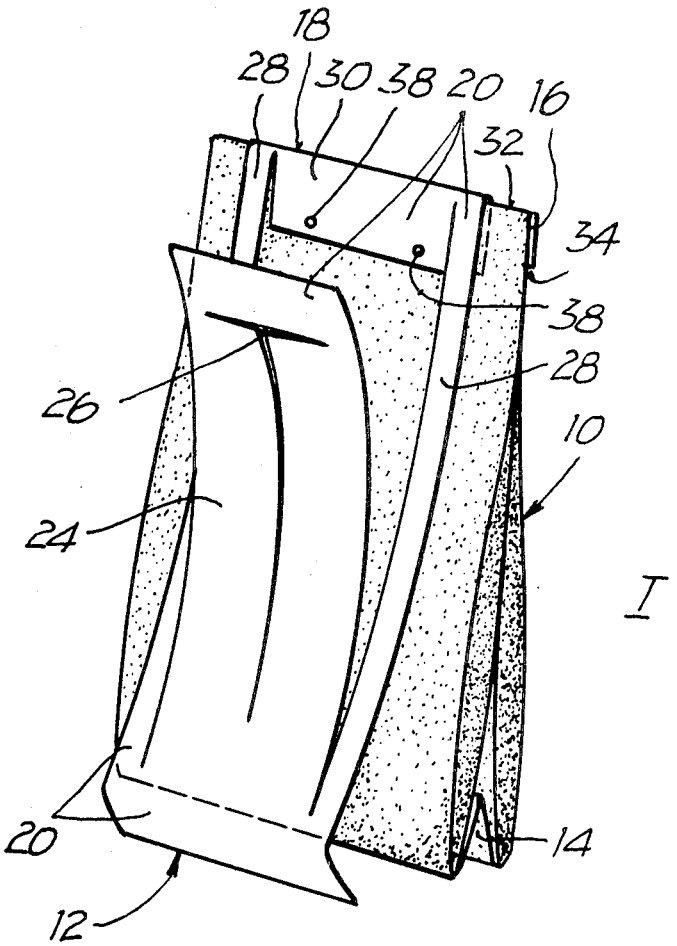

Fig.1.
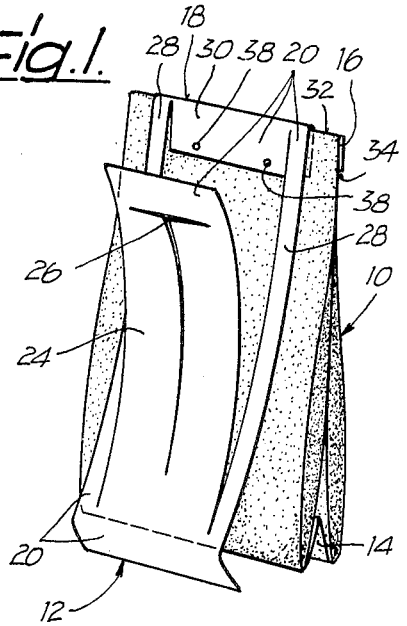
Fig.2.
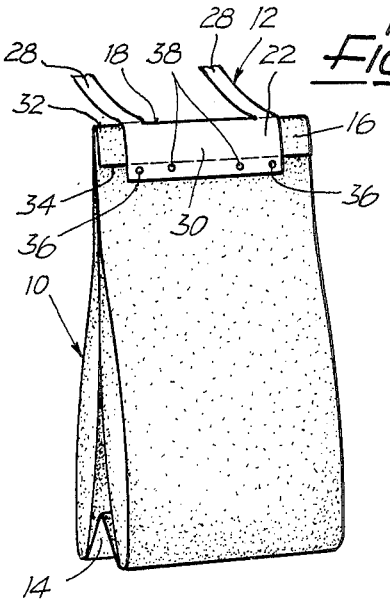
I
Fig.3.
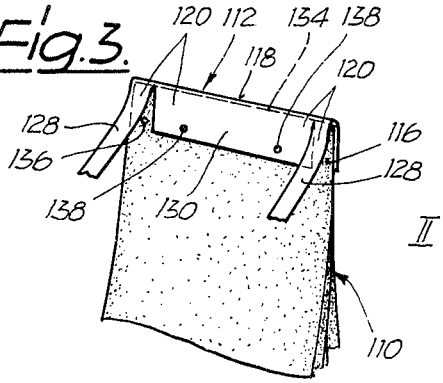
Fig.4.
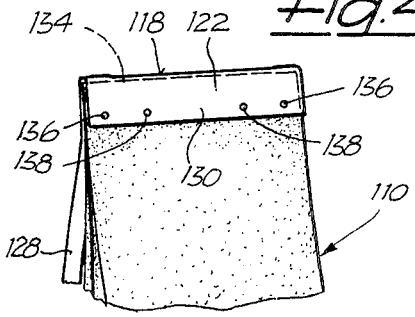
II
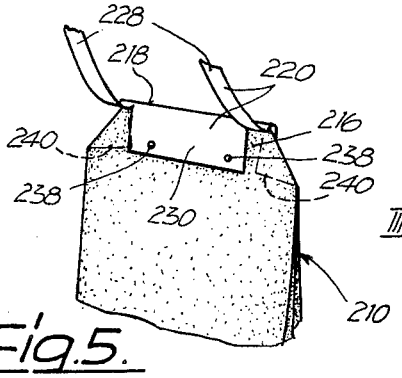
Fig.5.
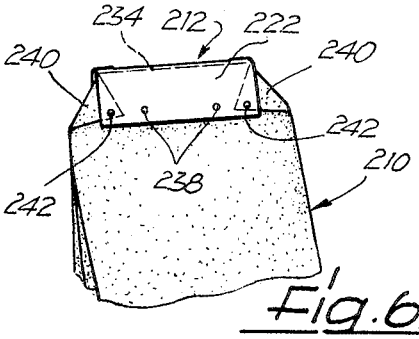
Fig.6.
III